US012095845B1

(12) United States Patent
Maxwell et al.

(10) Patent No.: US 12,095,845 B1
(45) Date of Patent: Sep. 17, 2024

(54) METHOD AND SYSTEM FOR PERFORMING AN OPERATION IN RESPONSE TO A SESSION HANDOFF

(71) Applicant: The Toronto-Dominion Bank, Toronto (CA)

(72) Inventors: Karen Maxwell, Toronto (CA); Amanda Buchanan, Toronto (CA)

(73) Assignee: The Toronto-Dominion Bank, Ontario (CA)

( * ) Notice: Subject to any disclaimer, the term of this patent is extended or adjusted under 35 U.S.C. 154(b) by 0 days.

(21) Appl. No.: 18/174,167

(22) Filed: Feb. 24, 2023

(51) Int. Cl.
| *H04L 12/00* | (2006.01) |
| *G06Q 20/08* | (2012.01) |
| *H04L 67/04* | (2022.01) |
| *H04L 67/14* | (2022.01) |

(52) U.S. Cl.
CPC ......... *H04L 67/04* (2013.01); *G06Q 20/0855* (2013.01); *H04L 67/14* (2013.01)

(58) Field of Classification Search
CPC ...... H04L 67/04; H04L 64/14; G06Q 20/0855
USPC .................................................. 709/222–224
See application file for complete search history.

(56) References Cited

U.S. PATENT DOCUMENTS

| 7,287,003 | B2 | 10/2007 | Hodson et al. |
| 7,637,426 | B1 | 12/2009 | Green |
| 7,647,247 | B2 | 1/2010 | Abraham et al. |
| 7,949,572 | B2 | 5/2011 | Perrochon et al. |
| 10,631,211 | B1* | 4/2020 | Fang ................. H04W 36/0055 |
| 11,416,909 | B1 | 8/2022 | Bholse et al. |
| 11,496,938 | B1* | 11/2022 | Malhotra ................ H04W 8/08 |
| 11,709,804 | B1* | 7/2023 | Korepanov ........... G06F 16/183 |
| | | | 707/822 |
| 2003/0009577 | A1* | 1/2003 | Apostolopoulos .... H04L 69/329 |
| | | | 709/231 |
| 2007/0291694 | A1* | 12/2007 | Zhang ..................... H04L 67/14 |
| | | | 370/351 |
| 2009/0254447 | A1 | 10/2009 | Blades |
| 2009/0299875 | A1 | 12/2009 | Zhu et al. |
| 2013/0308601 | A1* | 11/2013 | Brownworth ..... H04W 36/0016 |
| | | | 370/331 |
| 2014/0073327 | A1* | 3/2014 | Le Rouzic .......... H04L 12/5692 |
| | | | 455/436 |
| 2014/0078898 | A1* | 3/2014 | Anchan ............ H04W 36/0066 |
| | | | 370/230 |
| 2017/0111455 | A1* | 4/2017 | Raju ..................... H04L 67/141 |

(Continued)

FOREIGN PATENT DOCUMENTS

CN 106204081 A 12/2016

*Primary Examiner* — Frantz Coby
(74) *Attorney, Agent, or Firm* — Rowand LLP

(57) ABSTRACT

A server computer system, comprises a processor; a communications module coupled to the processor; and a memory coupled to the processor, the memory storing instructions that, when executed, configure the processor to receive, via the communications module and from a third party server computer system, a session handoff that includes session definition data identifying two or more items; provide, via the communications module and to a client device, a user interface for defining instructions based on the session definition data; receive, via the communications module and from the client device, the instructions defining at least one threshold associated with the two or more items; and perform an operation in accordance with the instructions defining the at least one threshold.

20 Claims, 14 Drawing Sheets

(56) References Cited

U.S. PATENT DOCUMENTS

| | | | | |
|---|---|---|---|---|
| 2019/0297544 | A1* | 9/2019 | Crawford | H04L 67/10 |
| 2020/0139961 | A1* | 5/2020 | Atarius | B60W 30/09 |
| 2020/0162959 | A1* | 5/2020 | Radlein | H04L 67/101 |
| 2021/0274570 | A1* | 9/2021 | Catovic | H04W 28/06 |
| 2021/0359954 | A1* | 11/2021 | Mestery | H04L 67/146 |
| 2022/0337615 | A1* | 10/2022 | Hwang | H04L 45/22 |
| 2023/0196398 | A1* | 6/2023 | Tay | G06Q 20/12 |
| | | | | 705/14.23 |

* cited by examiner

US 12,095,845 B1

METHOD AND SYSTEM FOR PERFORMING AN OPERATION IN RESPONSE TO A SESSION HANDOFF

TECHNICAL FIELD

The present application relates to methods and systems for performing an operation in response to a session handoff.

BACKGROUND

In a computer network, operations may be performed to share or transfer resources between nodes of a network. For example, operations may be performed to transfer computing resources, such as processing units, memory, etc. between nodes to attain a desired distribution of resources for a computer network.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
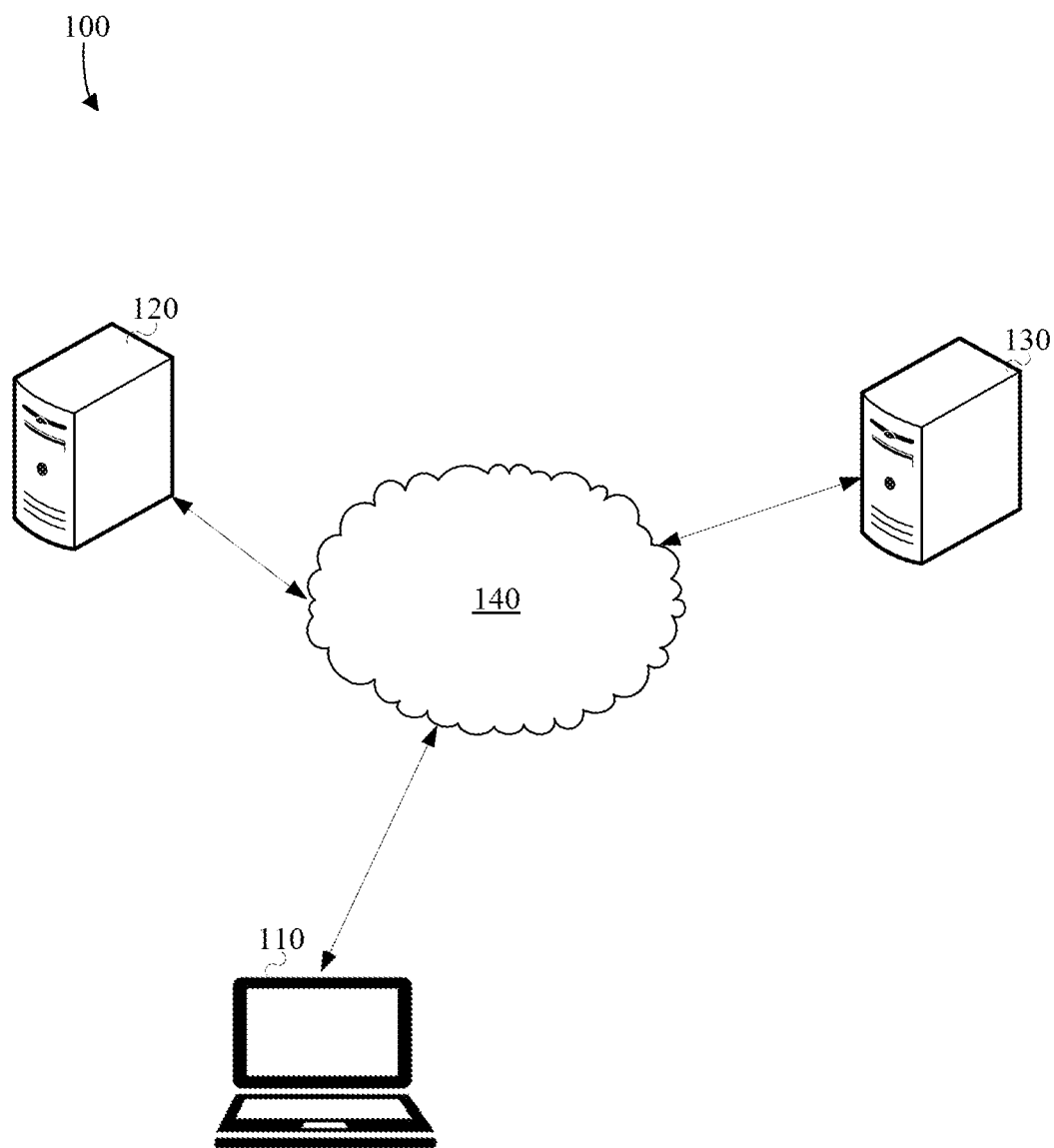
FIG. 1 is a schematic operation diagram illustrating an operating environment of an example embodiment.

Accordingly, in one aspect there is provided a server computer system, comprising a processor; a communications module coupled to the processor; and a memory coupled to the processor, the memory storing instructions that, when executed, configure the processor to receive, via the communications module and from a third party server computer system, a session handoff that includes session definition data identifying two or more items; provide, via the communications module and to a client device, a user interface for defining instructions based on the session definition data; receive, via the communications module and from the client device, the instructions defining at least one threshold associated with the two or more items; and perform an operation in accordance with the instructions defining the at least one threshold.

In one or more embodiments, the session definition data is received by way of an application programming interface redirect initiated by the third party server computer system.

In one or more embodiments, the at least one threshold includes a trigger threshold and the operation is performed in response to determining that a sum of attributes of the two or more items is less than the trigger threshold.

In one or more embodiments, the operation includes sending, via the communications module and to the client device, an alert indicating that the sum of the attributes of the two or more items is less than the trigger threshold.

In one or more embodiments, the alert includes a selectable option that, when selected, causes the server computer system to perform a pay-by-bank operation to complete a transfer request.

In one or more embodiments, the instructions define a transfer request and the operation includes sending, via the communications module and to the third party server computer system, the transfer request.

In one or more embodiments, the transfer request is sent after successful authentication of the client device.

In one or more embodiments, the transfer request defines a transfer amount that is less than a sum of attributes of the two or more items, the transfer amount specified by the at least one threshold.

In one or more embodiments, the instructions, when executed, further configure the processor to receive, via the communications module and from the third party server computer system, an indication of acceptance of the transfer request; and perform a pay-by-bank operation to complete the transfer request.

In one or more embodiments, performing the pay-by-bank operation to complete the transfer includes transferring a transfer amount from an account associated with the client device to an account associated with the third party server computer system.

According to another aspect there is provided a computer-implemented method, comprising receiving, via a communications module and from a third party server computer system, a session handoff that includes session definition data identifying two or more items; providing, via the communications module and to a client device, a user interface for defining instructions based on the session definition data; receiving, via the communications module and from the client device, the instructions defining at least one threshold associated with the two or more items; and performing an operation in accordance with the instructions defining the at least one threshold.

In one or more embodiments, the session definition data is received by way of an application programming interface redirect initiated by the third party server computer system.

In one or more embodiments, the instructions define a trigger threshold and the operation is performed in response to determining that a sum of attributes of the two or more items is less than the trigger threshold.

In one or more embodiments, the operation includes sending, via the communications module and to the client device, an alert indicating that the sum of the attributes of the two or more items is less than the trigger threshold.

In one or more embodiments, the alert includes a selectable option that, when selected, causes the server computer system to perform a pay-by-bank operation to complete a transfer request.

In one or more embodiments, the instructions define a transfer request and the operation includes sending, via the communications module and to the third party server computer system, the transfer request.

In one or more embodiments, the transfer request is sent after successful authentication of the client device.

In one or more embodiments, the transfer request defines a transfer amount that is less than a sum of attributes of the two or more items, the transfer amount specified by the at least one threshold.

In one or more embodiments, the method further comprising receiving, via the communications module and from the third party server computer system, an indication of acceptance of the transfer request; and performing a pay-by-bank operation to complete the transfer request by transferring a transfer amount from an account associated with the client device to an account associated with the third party server computer system.

According to another aspect there is provided a non-transitory computer readable storage medium comprising processor-executable instructions which, when executed, configure a processor to receive, via a communications module and from a third party server computer system, a session handoff that includes session definition data identifying two or more items; provide, via the communications module and to a client device, a user interface for defining instructions based on the session definition data; receive, via the communications module and from the client device, the instructions defining at least one threshold associated with the two or more items; and perform an operation in accordance with the instructions defining the at least one threshold.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a block diagram illustrating an operating environment of an example embodiment. Various components cooperate to provide a system 100 which may be used, for example, to perform post-transfer instructions. As shown, the system 100 includes a client device 110, a server computer system 120 and a third party server computer system 130 coupled to one another through a network 140.

The client device 110 is configured to communicate with the server computer system 120 and the third party server computer system 130 via the network 140 and vice-versa. The client device 110 may be remote from the server computer system 120 and the third party server computer system 130.

The server computer system 120 is configured to communicate with the third party server computer system 130 via the network 140 and vice-versa. In one or more embodiments, the server computer system 120 may engage an application programming interface (API) that may be used to communicate with the third party server computer system 130 and vice-versa. The server computer system 120 may be remote from the third party server computer system 130.

The client device 110 may be a laptop computer as shown in FIG. 1. However, the client device 110 may be a computing device of another type such as for example a mobile device, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 may be referred to as a transfer server and may be configured to complete transfers according to transfer requests. In at least some embodiments, the server computer system 120 may transfer computing resources between different nodes in a computer network. In at least some embodiments, the server computer system 120 may be a financial institution server. In these embodiments, the server computer system 120 may maintain a database that includes various data records. A data record may, for example, reflect an amount of value stored in a particular account. The transfers may be completed by transferring value from a particular account maintained by the server computer system 120.

Each account maintained by the server computer system 120 may be associated with authentication information. The authentication information may be or may include any one or more of a token, a username, a password, a personal identification number (PIN), biometric data, etc. The authentication information may be used by the server computer system 120 to authenticate a device such as for example the client device 110. More specifically, the authentication information may be used to determine that the client device 110 is being operated by an authorized user and to identify the one or more accounts the user is trying to access.

The third party server computer system 130 may be maintained by a third party that does not maintain the server computer system 120. In one or more embodiments, the third party server computer system 130 may be referred to as a hypervisor or virtual machine monitor that may manage computer resource allocation for the server computer system 120.

In one or more embodiments, the third party server computer system 130 may be associated with a merchant and/or an e-commerce platform. The third party server computer system 130 may communicate session definition data to the server computer system 120. The session definition data may identify two or more items that the user operating the client device 110 would like to purchase. In one or more embodiments, the third party server computer system 130 may communicate transfer requests to the server computer system 120 and the session definition data may be included with the transfer requests. As will be described in more detail, in one or more embodiments, the third party server computer system 130 may engage an API and may communicate session definition data to the server computer system 120 by way of an API redirect.

The server computer system 120 and the third party server computer system 130 are computer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 140 is a computer network. The network 140 may include a public network such as the Internet and/or a private network. In some embodiments, the network 140 may be an internetwork such as may be formed of one or more interconnected computer networks. For example, the network 140 may be or may include an Ethernet network, a wireless network, a telecommunications network, or the like.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
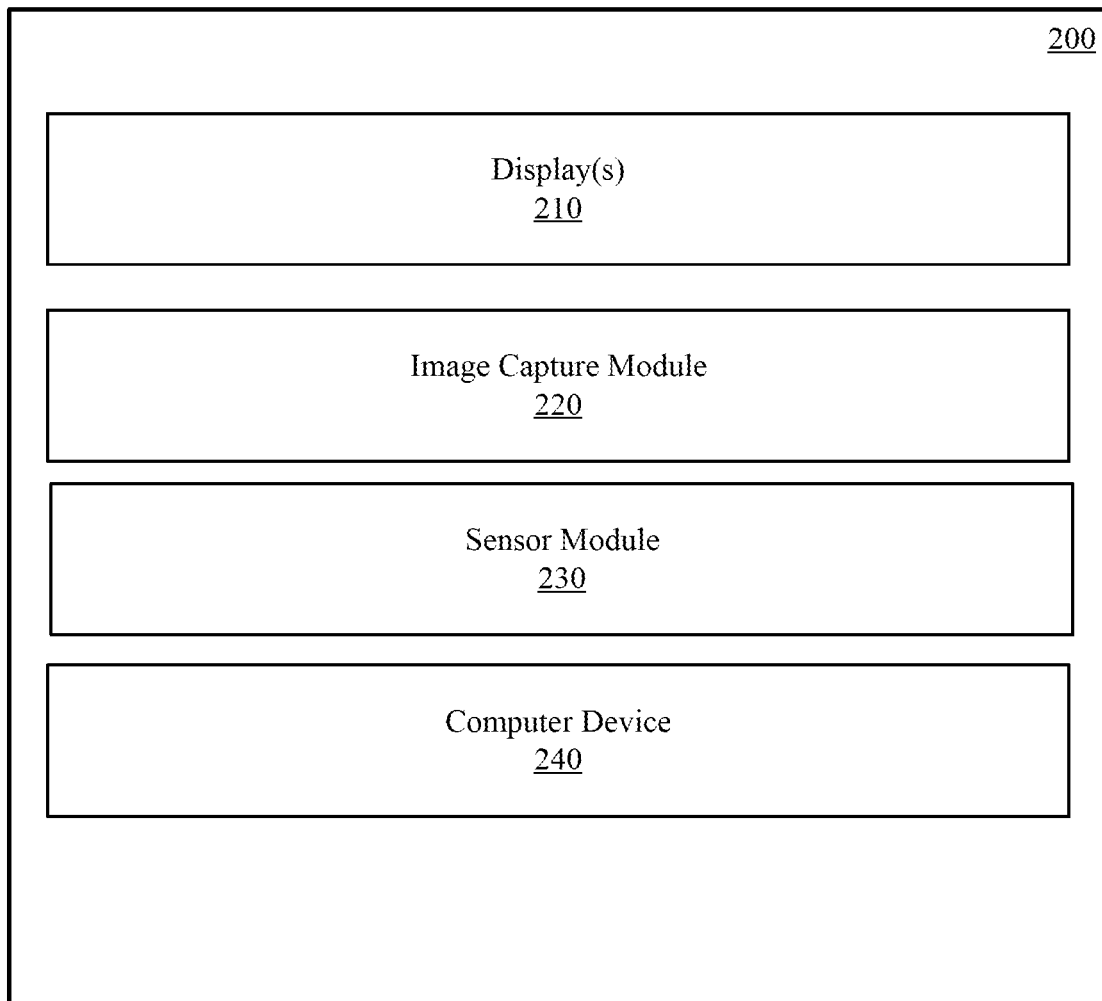
FIG. 2 is a simplified schematic diagram showing components of a computing device.

FIG. 2 is a simplified schematic diagram showing components of an exemplary computing device 200. The client device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
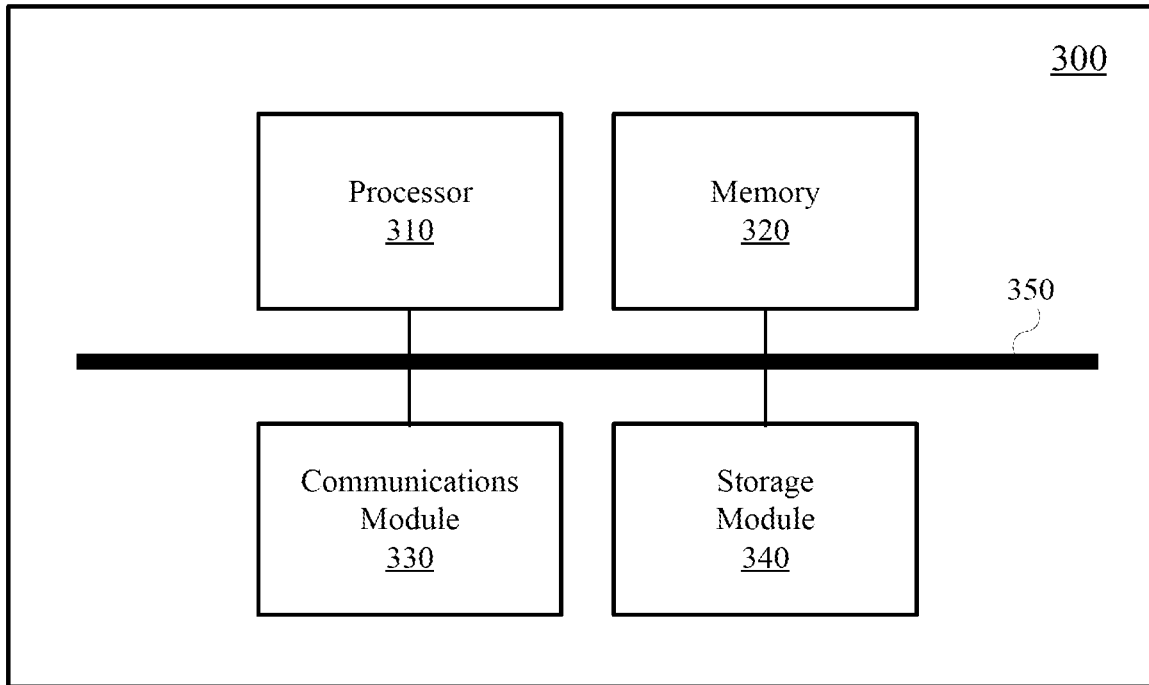
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server computer system 120 and/or the third party server computer system 130.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
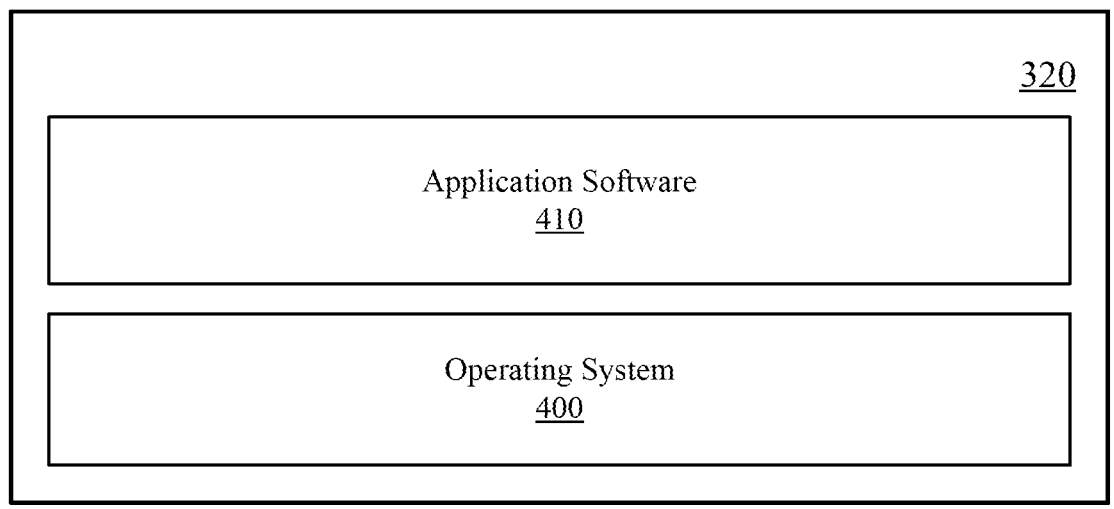
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server computer system 120 and/or the third party server computer system 130.

While a single application 410 is illustrated in FIG. 4, in operation the memory 320 may include more than one application 410 and different applications 410 may perform different operations. For example, in at least some embodiments in which the computer device 300 functions as the client device 110, the applications 410 may include a banking application. The banking application may be configured for secure communications with the server computer system 120 and may provide various banking functions such as, for example, the ability to display a quantum of value in one or more data records (e.g., display balances), configure or request that operations such as transfers of value (e.g., bill payments, email money transfers and other transfers) be performed, and other account management functions. For example, the banking application may be configured to authenticate the user to authorize a transfer request that defines a transfer amount and to define instructions based on session definition data.

By way of further example, in at least some embodiments in which the computer device 300 functions as the client device 110, the applications 410 may include a web browser, which may also be referred to as an Internet browser. In at least some such embodiments, the server computer system 120 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g., display balances), configure or request that operations such as transfers of value (e.g. bill payments and other transfers) be performed, and other account management functions. For example, the banking interface may be configured to authenticate the user to authorize a transfer request that defines a transfer amount and to define instructions based on session definition data.

Further, as mentioned, in at least some embodiments the third party server computer system 130 may be associated with a merchant and/or an e-commerce platform. In these embodiments, the third party server computer system 130 may be a web server. The web server may cooperate with the web browser and may serve as an interface when the interface is requested through the web browser. For example, the web browser may serve as an e-commerce interface for the merchant. The e-commerce interface may enable a user operating the client device 110 to shop for one or more products or services and to complete a purchase for the one or more products or services.

In one or more embodiments, the user may operate the client device 110 to select one or more items for purchase on an e-commerce interface provided by the third party server computer system 130. During the e-commerce experience, such as for example during a checkout experience, the third party server computer system 130 may cause the client device 110 to present an interface that includes a selectable option to initiate pay-by-bank. In response to selection of the selectable option, the third party server computer system 130 may cause the client device 110 to present an interface that includes a list of financial institutions that are available for pay-by-bank. Each financial institution displayed on the user interface may be selectable by the user. The user may select their financial institution and in response the third party server computer system 130 may perform operations to redirect or handoff the session to the server computer system associated with the selected financial institution. The server computer system may include the server computer system 120 described herein.

In response to selection of the financial institution, the server computer system 120 may require authentication of the client device 110. As such, the server computer system 120 may perform operations that cause the client device 110 to request authentication information. The authentication information may be or may include any one or more of a token, a username, a password, a personal identification number (PIN), biometric data, etc. The authentication information may be used by the server computer system 120 to authenticate the client device 110. More specifically, the authentication information may be used to determine that the client device 110 is being operated by an authorized user and to identify an account for the transfer.

To redirect or handoff the session to the server computer system 120, the third party server computer system 130 may engage an application programming interface (API) and the API may be associated with the server computer system 120. The API may be engaged by initiating an API call that includes at least session definition data. In one or more embodiments, the session definition data may identify the one or more items selected by the user. The session definition data may include additional data such as for example attributes of the one or more items where the attributes may include a price of the one or more items. The session definition data may additionally include pay-by-bank data such as for example account details of an account associated with the merchant that is to receive a pay-by-bank transfer. The third party server computer system 130 may perform operations to complete an API redirect to the server computer system 120 and in this manner the session is redirected to the server computer system 120. The API redirect may be completed prior to authentication of the client device 110 or after authentication of the client device 110.

Figure 5:
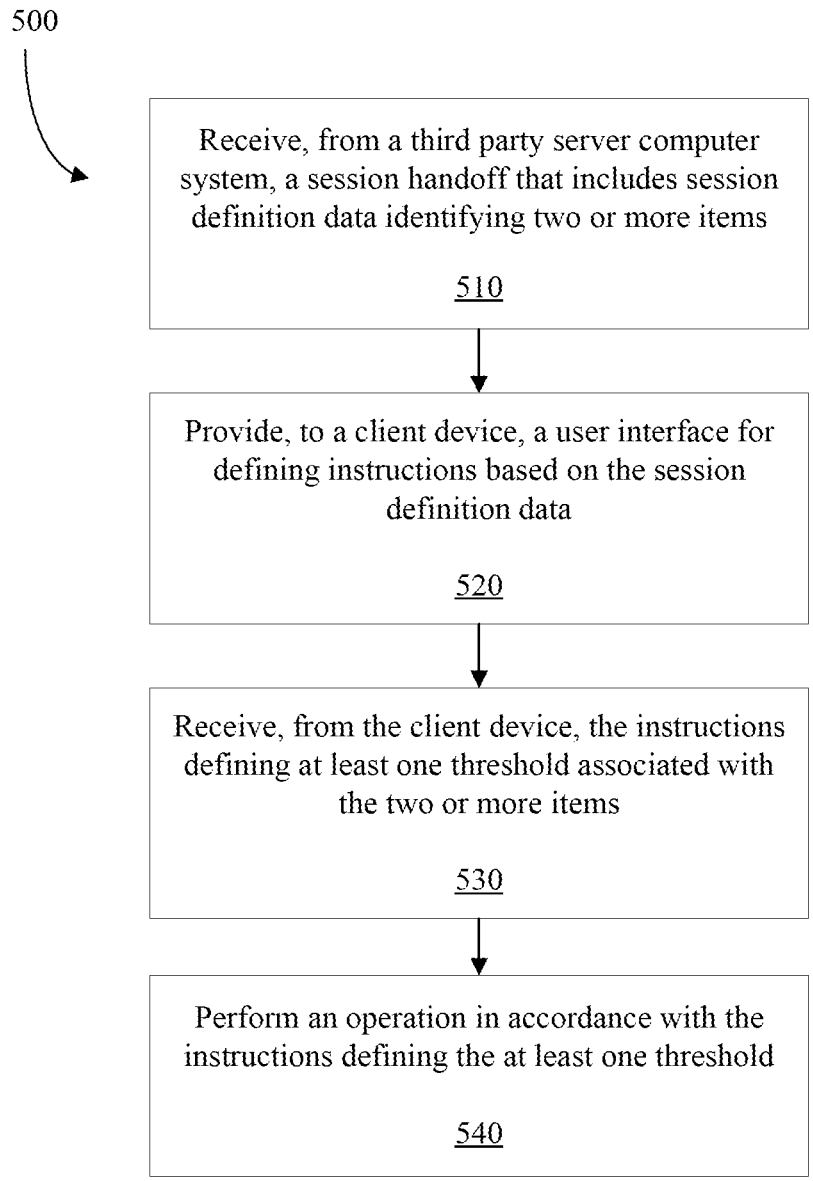
FIG. 5 is a flowchart showing operations performed by a server in performing an operation according to an embodiment.

After successful authentication of the client device 110 and completion of the API redirect, the server computer system 120 may perform computer operations to perform an operation. FIG. 5 is a flowchart showing computer operations of a method 500 which may be performed by the server computer system 120. For example, computer-executable instructions stored in memory of the server computer system 120 may, when executed by one or more processors, configure the server computer system 120 to perform the method 500 or a portion thereof. The server computer system 120 may offload some of the operations to the client device 110 and/or the third party server computer system 130.

The method 500 includes receiving, from a third party server computer system, a session handoff that includes session definition data identifying two or more items (step 510).

In one or more embodiments, the session definition data may identify two or more items that are computer resources. For example, the two or more items may include virtual processors that may be at least partially available to the server computer system 120.

In one or more embodiments, the session handoff may be received by way of the API redirect initiated by the third party server computer system 130. For example, as mentioned above, the third party server computer system 130 may engage an API that may be associated with the server computer system 120. The API may be engaged by initiating an API call that includes session definition data. The third party server computer system 130 may perform operations to complete an API redirect to the server computer system 120 and in this manner the completion of the transfer is redirected to the server computer system 120. The API redirect may be completed prior to authentication of the client device 110 or after authentication of the client device 110. In these embodiments, the session handoff may be initiated in response to a pay-by-bank request.

In one or more embodiments, the session handoff may be received directly from the third party server computer system 130. For example, the third party server computer system 130 may store, in a database, protocol information that may be used to generate the session handoff in a format that is compliant with requirements of the server computer system 120. In this example, in response to selection of the financial institution associated with the server computer system 120, the third party server computer system 130 may consult the database to determine the format that is compliant with requirements of the server computer system 120 and may generate the session handoff accordingly.

In another example, the third party server computer system 130 may request the format from a dedicated server computer system that may be associated with another third party. The dedicated server computer system may be available to any requesting party (such as the third party server computer system 130) and may provide the requesting party with the format complaint with any particular financial institution. In this example, in response to selection of the financial institution associated with the server computer system 120, the third party server computer system 130 may obtain the format that is compliant with requirements of the server computer system 120 from the dedicated server computer system and may generate the session handoff accordingly.

The session handoff includes session definition data. The session definition data identifies two or more items. The two or more items may include items selected by the user for purchase or for tracking. In one or more embodiments, the two or more items may be related. For example, a first item may include a bicycle, a second item may include a bicycle lock and a third item may include a bicycle helmet.

The session definition data may include additional data such as for example attributes of the two or more items. The attributes may include a price of the two or more items.

The session definition data may additionally include pay-by-bank data. It will be appreciated that the pay-by-bank data may be separate from the session definition data and may be communicated to the server computer system 120 prior to or after the server computer system 120 has received the session definition data.

In one or more embodiments, the pay-by-bank data may identify an account associated with the third party server computer system 130 that is to receive a transfer should the one or more items be purchased. The account may be an account hosted by a financial institution associated with the server computer system 120 or may be an account hosted by a different financial institution.

The method 500 includes providing, to a client device, a user interface for defining instructions based on the session definition data (step 520).

As mentioned, the session definition data may identify two or more items that are computer resources such as for example virtual processors. As such, the user interface may be provided to define instructions relating to the virtual processors. The instructions may include a request to connect to or engage the virtual processors identified in the session definition data.

In one or more embodiments, in response to the API redirect, the server computer system 120 may communicate with the client device 110 and may cause the client device to display one or more graphical user interfaces. The one or more graphical user interfaces may include one or more graphical user interfaces that may be used to define instructions based on the session definition data.

The instructions are instructions that the server computer system 120 must execute. The instructions are required to be completed by the server computer system 120 and not the third party server computer system 130. In this manner, the reliance on the third party server computer system 130 is reduced. Put another way, once the session has been handed off to the server computer system 120, the third party server computer system 130 is not required to complete the instructions. As a result, network traffic and/or network bandwidth is reduced.

The method 500 includes receiving, from the client device, the instructions defining at least one threshold associated with the two or more items (step 530).

The user may operate the client device 110 to define the instructions based on the session definition data. Once completed, the instructions are received from the client device 110.

The instructions define at least one threshold associated with the two or more items. In one or more embodiments, the at least one threshold includes a trigger threshold. The trigger threshold may be based on one or more attributes of the two or more items.

In one or more embodiments, the trigger threshold may indicate minimum available processing power from the virtual processors. The minimum available processing power is a sum of or a total of processing power available from the virtual processors identified in the session definition data. In these embodiments, the instructions may include an instruction to connect a node to the virtual processors once the minimum available processing power is available.

In one or more embodiments, the trigger threshold may indicate a maximum price that the user would pay for the two or more items. The maximum price is a sum for the two or more items. Put another way, the maximum price is a maximum total price for the two or more items. The maximum price is not a maximum price for each individual item. In these embodiments, the instructions may include an instruction to set up an alert for notifying the user of the client device 110 that the sum of the attributes of the two or more items is less than the trigger threshold.

In one or more embodiments, the instructions define a transfer request. The transfer request may include a transfer amount that is less than a sum of attributes of the two or more items. The transfer amount may be specified by the trigger threshold that indicates the maximum price that the user would pay for the two or more items. In these embodiments, the instructions may include an instruction to submit a transfer request to the third party server computer system 130 that includes the transfer amount. The transfer request may be a request to purchase the two or more items for the transfer amount. In one or more embodiments, the transfer request may be similar to a bid or an offer to purchase the two or more items.

The method 500 includes performing an operation in accordance with the instructions defining the at least one threshold (step 540).

In one or more embodiments, the instructions may include an instruction to connect a node to the virtual processors once the minimum available processing power is available. As such, an operation may be performed to connect the node to the virtual processors when it is determined that the minimum available processing power is available.

In one or more embodiments, the server computer system 120 verifies an authentication status of the client device 110 prior to performing the operation. For example, the server computer system 120 may determine whether or not the client device 110 has been successfully authenticated. If the client device 110 has not been authenticated, the server computer system 120 may perform operations that cause the client device 110 to request authentication information. The authentication information may be or may include any one or more of a token, a username, a password, a personal identification number (PIN), biometric data, etc. The authentication information may be used by the server computer system 120 to authenticate the client device 110.

Once the authentication status of the client device 110 has been verified, the server computer system 120 may perform operations to perform the operation in accordance with the instructions defining the at least one threshold.

In one or more embodiments where the instructions define a transfer request, the server computer system 120 may perform an operation that includes sending, to the third party server computer system 130, the transfer request. The transfer request may be sent after successful authentication of the client device 110. The transfer request may include a transfer amount that is less than a sum of attributes of the two or more items. The transfer amount may be specified by the trigger threshold that indicates the maximum price that the user would pay for the two or more items The transfer request may be a request to purchase the two or more items for the transfer amount. In one or more embodiments, the transfer request may be similar to a bid or an offer to purchase the two or more items.

In response to receiving the transfer request, the third party server computer system 130 may analyze the transfer request and may indicate acceptance or rejection of the transfer request. For example, the third party server computer system 130 may determine that the transfer amount is acceptable for the two or more items and as such may accept the transfer request. As such, the server computer system 120 may receive, from the third party server computer system 130, an indication of acceptance of the transfer request.

In response to receiving the indication of acceptance of the transfer request, in one or more embodiments the server computer system 120 may perform a pay-by-bank operation to complete the transfer. Performing the pay-by-bank operation to complete the transfer may include transferring a transfer amount from an account associated with the client device 110 to an account associated with the third party server computer system 130. The account associated with the client device 110 may be determined based on the authentication information. The account associated with the third party server computer system 130 may be determined based on the pay-by-bank data received during the session handoff.

In one or more embodiments, the operation may be performed by the server computer system 120 in response to determining that a sum of attributes of the two or more items is less than the trigger threshold. For example, as mentioned, the trigger threshold may indicate a maximum price that the user would pay for the two or more items. As such, the server computer system 120 may monitor the total price for the two or more items. The server computer system 120 may determine that the total price for the two or more items is less than or has dropped below the trigger threshold and in response may perform the operation. In this example, the operation may include sending, to the client device 110, an alert indicating that the sum of the attributes of the two or more items is less than the trigger threshold.

In one or more embodiments, the alert may include a selectable option that, when selected, causes the server computer system 120 to perform a pay-by-bank operation to complete a transfer. For example, the alert may indicate that the total price for the two or more items is less than the trigger threshold and may include a selectable option to automatically purchase the two or more items using pay-by-bank.

In response to selection of the selectable option, the server computer system 120 may receive a signal indicating selection of the selectable option from the client device 110 and in response the server computer system 120 may perform a pay-by-bank operation to complete the transfer. Performing the pay-by-bank operation to complete the transfer may include transferring a transfer amount from an account associated with the client device 110 to an account associated with the third party server computer system 130. The account associated with the client device 110 may be determined by the server computer system 120 based on the authentication information. The account associated with the third party server computer system 130 may be determined based on the pay-by-bank data received during the session handoff.

In manners described herein where the transfer request includes a pay-by-bank request, payment is automatically deposited from an account maintained by the server computer system 120 and associated with the client device 110 into an account associated with the third party server computer system 130. This is completed in real-time. The overall use of computing resources is reduced as the user operating the client device 110 is not required to enter payment information and the third party server computer system 130 is not required to store payment information in memory. Still further, since payment information is not stored by the third party server computer system 130, the overall risk of potential fraud is reduced.

Figure 6:
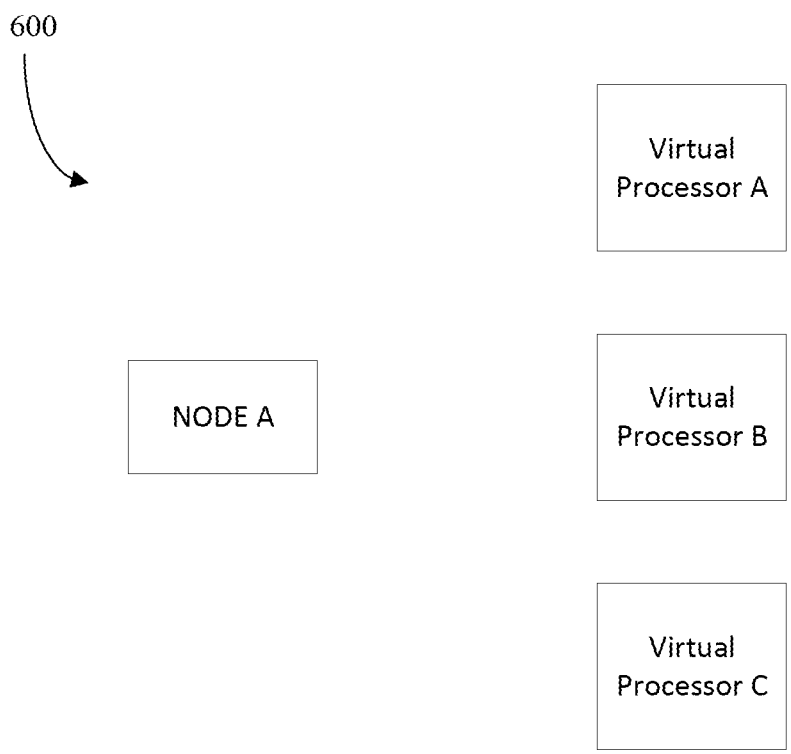
FIG. 6 is a schematic diagram illustrating a node of a computing network and shared resources of the computing network according to an embodiment.
Figure 7:
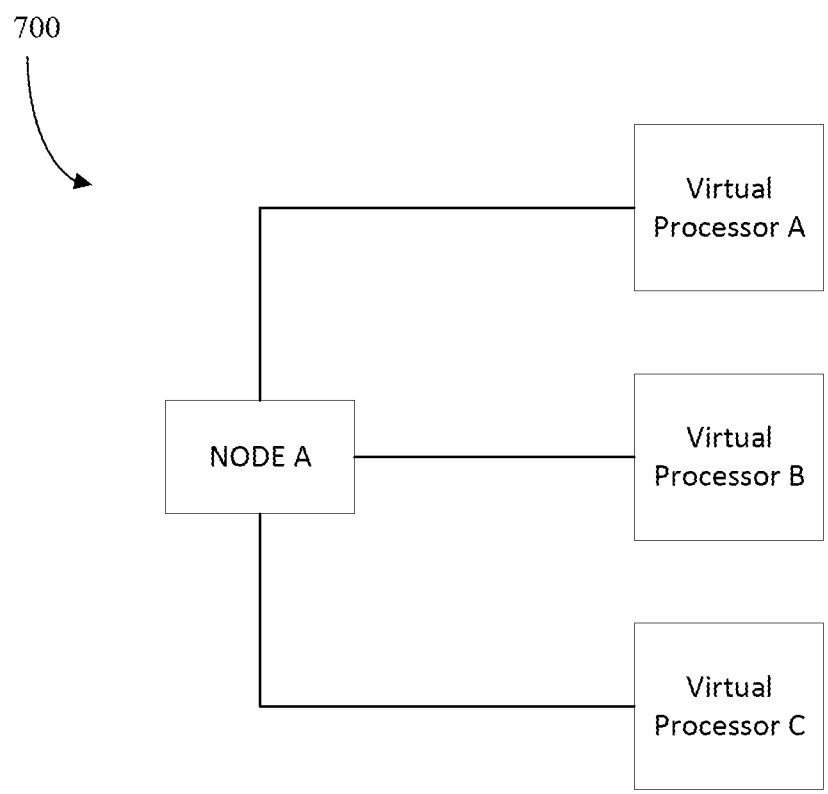
FIG. 7 is a schematic diagram illustrating a node of a computing network connected to the shared resources of the computing network according to an embodiment.

An example of performing an instruction to connect a node to virtual processors will now be described with reference to FIGS. 6 and 7. An example schematic diagram illustrating a node of a computing network and shared resources of the computing network is shown in FIG. 6. As can be seen, a computing network 600 includes a node A, a virtual processor A, a virtual processor B, and a virtual processor C. It will be appreciated that the computer network may include additional devices such as for example additional nodes and/or additional virtual processors.

In this example, the session definition data may identify the virtual processors A, B and C and the instruction may include an instruction to connect node A to virtual processors A, B and C once the minimum processing power is available. As such, an operation may be performed to connect the node A to the virtual processors A, B, C when it is determined that the minimum available processing power is available. The server computer system 120 may perform operations to connect the node A to the virtual processors A, B and C as illustrated in FIG. 7 with reference to a computer network 700.

Example user interfaces that may be displayed in accordance with embodiments described herein are shown in FIGS. 8 to 15.

Figure 8:
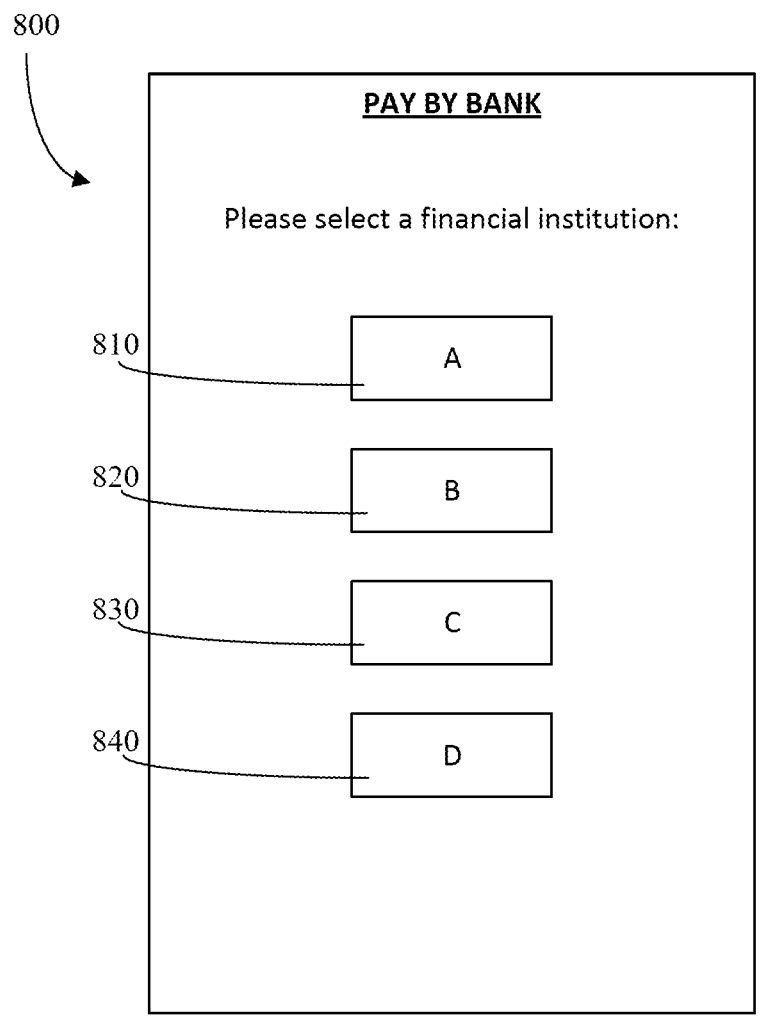
FIG. 8 is an example graphical user interface for selecting a particular financial institution according to an embodiment.

FIG. 8 includes a graphical user interface 800 that may be displayed on the client device 110. As can be seen, the graphical user interface 800 includes selectable options 810, 820, 830 and 840 to select a particular financial institution. The user operating the client device 110 may select their financial institution by performing, for example, a tap gesture at a location on a display screen of the client device 110 that corresponds to the location of the selectable option associated with their financial institution. In response to selection of the selectable option, the third party server computer system 130 may perform operations to handoff the session to the server computer system 120. The graphical user interface 800 may be displayed on the client device 110 prior to handoff of the session from the third party server computer system 130 to the server computer system 120.

Figure 9:
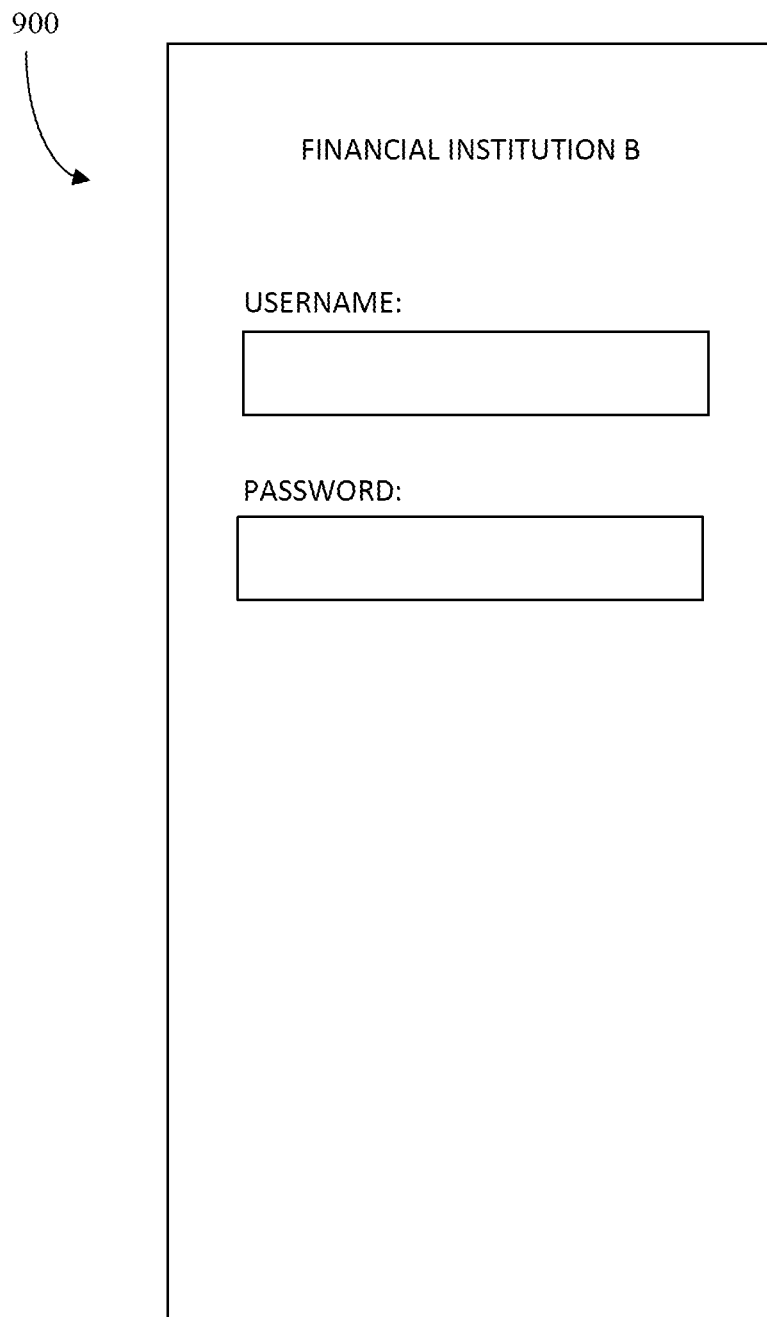
FIG. 9 is an example graphical user interface for entering authentication information according to an embodiment.

FIG. 9 includes a graphical user interface 900 that may be displayed on the client device 110 requesting authentication information, specifically a username and a password. The server computer system 120 may cause the client device 110 to display the graphical user interface 900 and this may be done in response to a successful handoff of the session from the third party server computer system 130 to the server computer system 120. The user may provide the authentication information using an input device such as a virtual keyboard associated with the client device 110. In response to submission of the authentication information, the server computer system 120 may perform operations to authenticate the client device 110 and to identify one or more accounts associated therewith.

Figure 10:
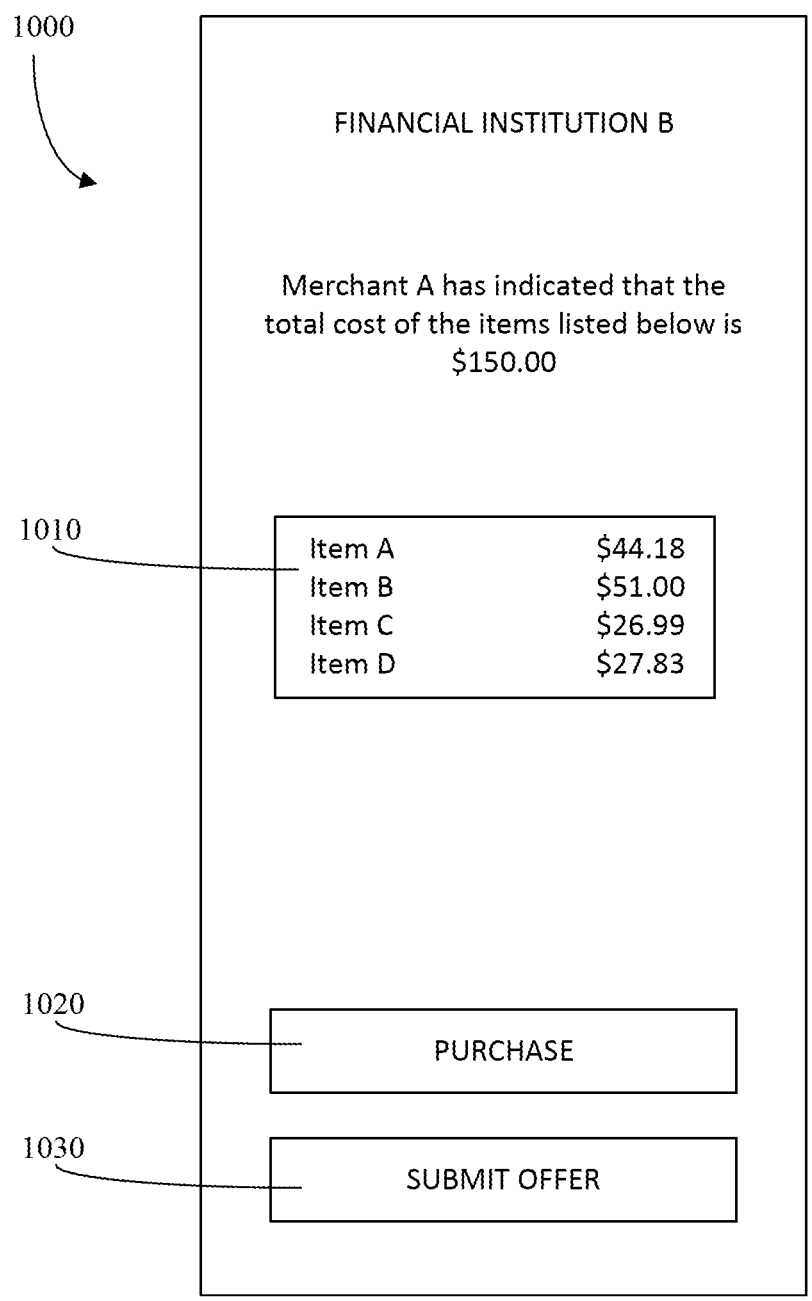
FIG. 10 is an example graphical user interface for defining instructions based on session definition data according to an embodiment.

FIG. 10 includes an example graphical user interface 1000 that may be displayed on the client device 110 after successful authentication and/or during step 520 of the method 500 described herein. As can be seen, the graphical user interface 1000 displays session definition data 1010. The graphical user interface 1000 includes a selectable option 1020 to purchase the two or more items identified by the session definition data and a selectable option 1030 to submit an offer to purchase the two or more items identified by the session definition data. The user may select one of the selectable options by performing, for example, a tap gesture at a location on a display screen of the client device 110 that corresponds to the location of the selectable option associated with the desired instruction. In response to selection of the selectable option 1020, the server computer system 120 may perform operations to purchase the two or more items identified by the session definition data and this may include the server computer system 120 performing a pay-by-bank operation.

Figure 11:
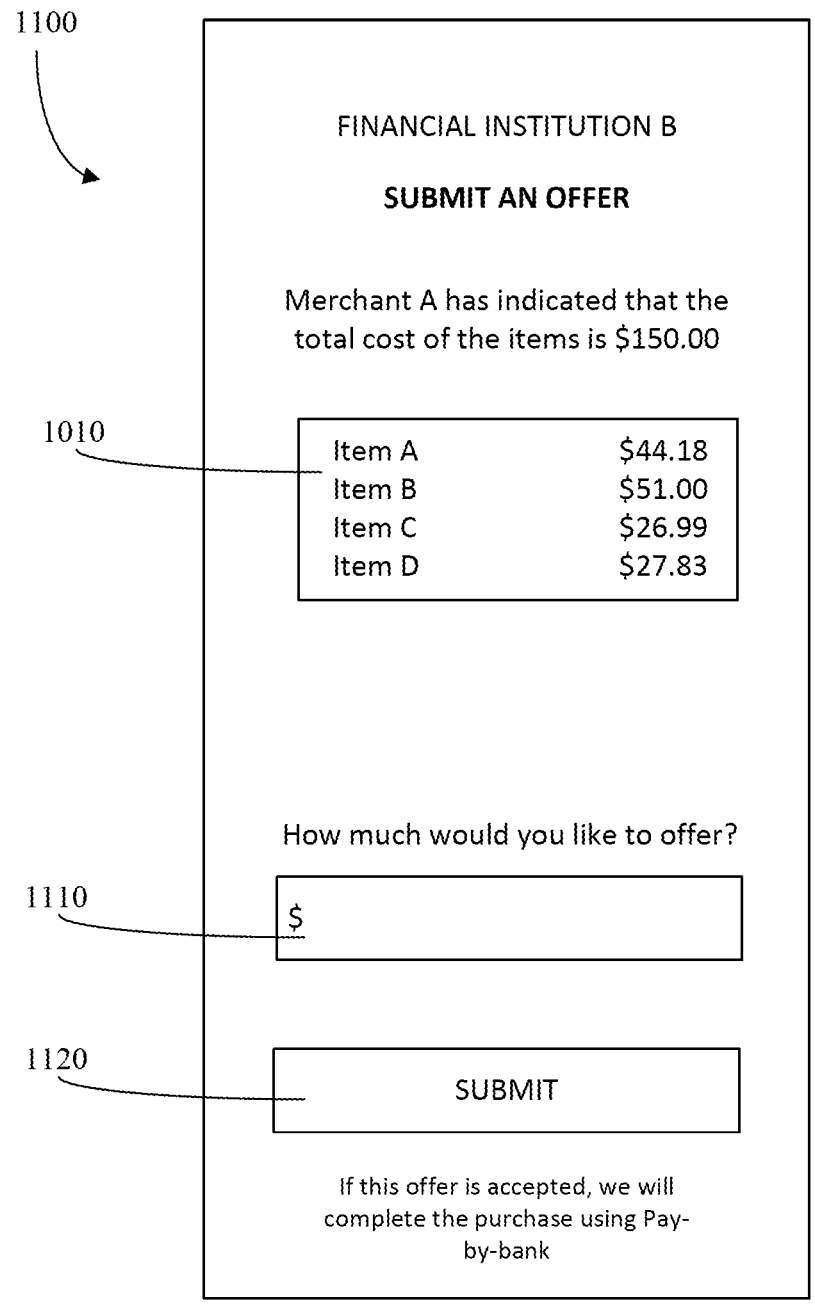
FIG. 11 is another example graphical user interface for defining instructions based on session definition data according to an embodiment.

In response to selection of the selectable option 1030, the server computer system 120 may cause the client device 110 to display a graphical user interface 1100 shown in FIG. 11. The graphical user interface 1100 displays the session definition data 1010 and includes an input field 1110 for entering an offer to purchase the two or more items identified by the session definition data and a selectable option 1120 to submit the offer to purchase the two or more items. The user may operate an input device associated with the client device 110 such as for example a virtual keyboard to provide input to the input field 1110. The offer to purchase the two or more items may be less than a total sum of the attributes of the two or more items, which in this example is a total cost of the two or more items. The user may enter the offer to purchase the two or more items. The user may select the selectable option 1120 to submit the offer to purchase the two or more items and in response the server computer system 120 may communicate the offer to the third party server computer system 130. The third party server computer system 130 may accept the offer and in response the server computer system 120 may automatically perform a pay-by-bank operation to complete the purchase using pay-by-bank.

Figure 12:
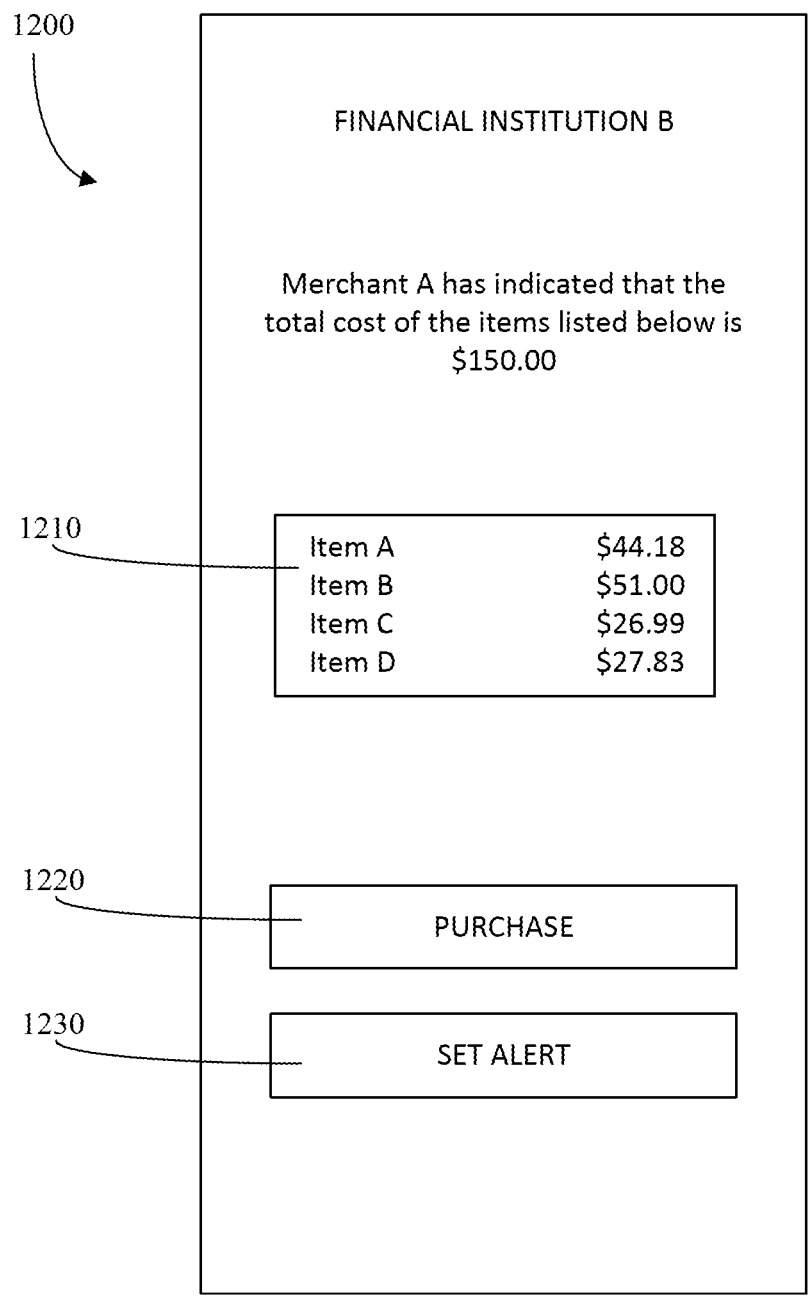
FIG. 12 is yet another example graphical user interface for defining instructions based on session definition data according to an embodiment.

FIG. 12 includes another example graphical user interface 1200 that may be displayed on the client device 110 after successful authentication and/or during step 520 of the method 500 described herein. As can be seen, the graphical user interface 1200 displays session definition data 1210. The graphical user interface 1200 includes a selectable option 1220 to purchase the two or more items identified by the session definition data and a selectable option 1230 to set an alert for the two or more items identified by the session definition data. The user may select one of the selectable options by performing, for example, a tap gesture at a location on a display screen of the client device 110 that corresponds to the location of the selectable option associated with the desired instruction. In response to selection of the selectable option 1220, the server computer system 120 may perform operations to purchase the two or more items identified by the session definition data and this may include the server computer system 120 performing a pay-by-bank operation.

Figure 13:
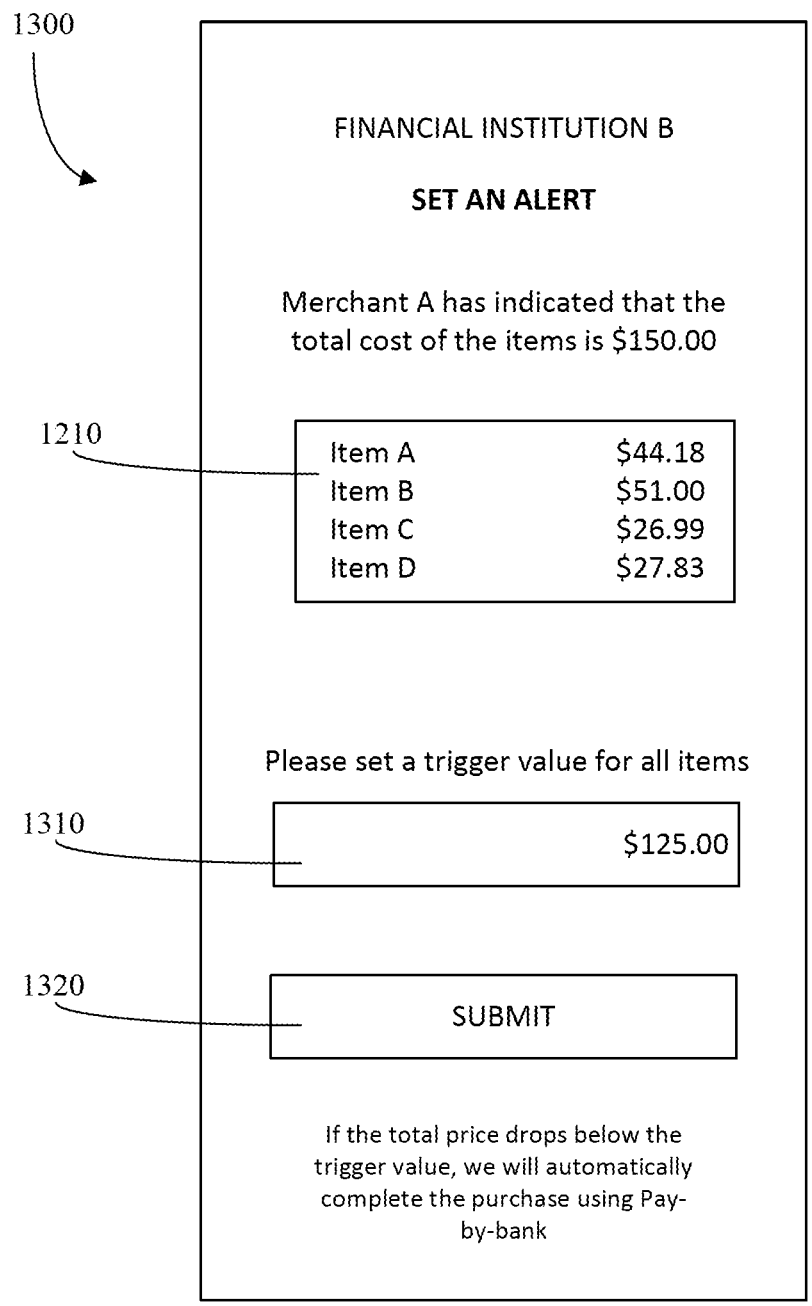
FIG. 13 is another example graphical user interface for entering a trigger threshold according to an embodiment.

In one example, in response to selection of the selectable option 1230, the server computer system 120 may cause the client device 110 to display a graphical user interface 1300 shown in FIG. 13. The graphical user interface 1300 displays the session definition data 1210 and includes an input field 1310 for entering an offer to purchase the two or more items identified by the session definition data and a selectable option 1320 to submit a trigger value for the two or more items. The user may operate an input device associated with the client device 110 such as for example a virtual keyboard to provide input to the input field 1310. The trigger value may be less than a total sum of the attributes of the two or more items, which in this example is a total cost of the two or more items. The user may enter the trigger value for the two or more items. The user may select the selectable option 1320 to submit the trigger value and in response the server computer system 120 may perform operations to monitor the price of the two or more items on behalf of the user. In the example shown in FIG. 13, the server computer system 120 may determine that the total price of the two or more items has dropped below the trigger threshold and in response the server computer system 120 may automatically perform a pay-by-bank operation to complete the purchase using pay-by-bank.

Figure 14:
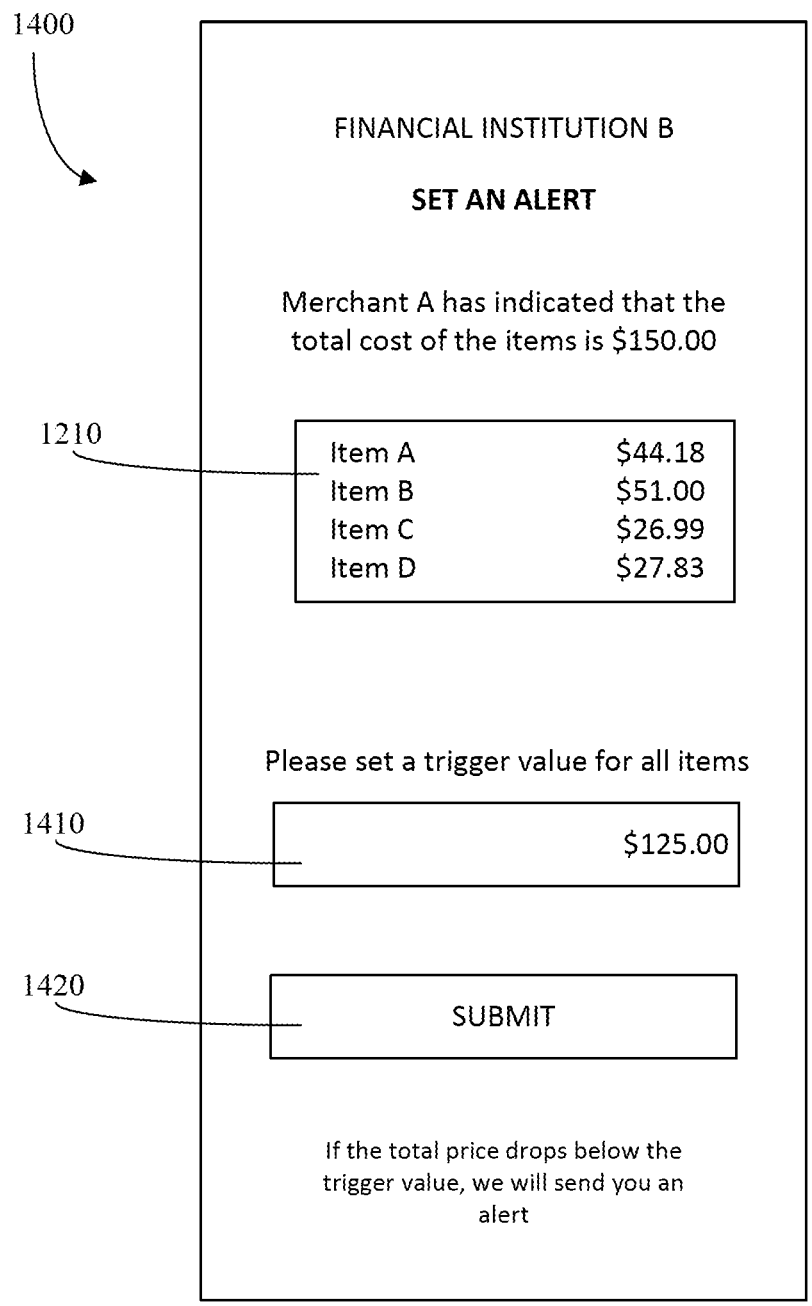
FIG. 14 is yet another example graphical user interface for entering a trigger threshold according to an embodiment.

As another example, in response to selection of the selectable option 1230 (FIG. 12), the server computer system 120 may cause the client device 110 to display a graphical user interface 1400 shown in FIG. 14. The graphical user interface 1400 is generally similar to the graphical user interface 1300 and in that the graphical user interface 1400 displays the session definition data 1210 and includes an input field 1410 for entering a trigger value and a selectable option 1420 to submit the trigger value. However, in this example, the user may select the selectable option 1420 to submit the trigger value and in response the server computer system 120 may perform operations to monitor the price of the two or more items on behalf of the user. In the example shown in FIG. 14, the server computer system 120 may determine that the total price of the two or more items has dropped below the trigger threshold and in response, rather than automatically performing a pay-by-bank operation as described with reference to FIG. 13, the server computer system 120 may send a notification to the client device 110 indicating that the total price of the two or more items has dropped below the trigger threshold.

Figure 15:
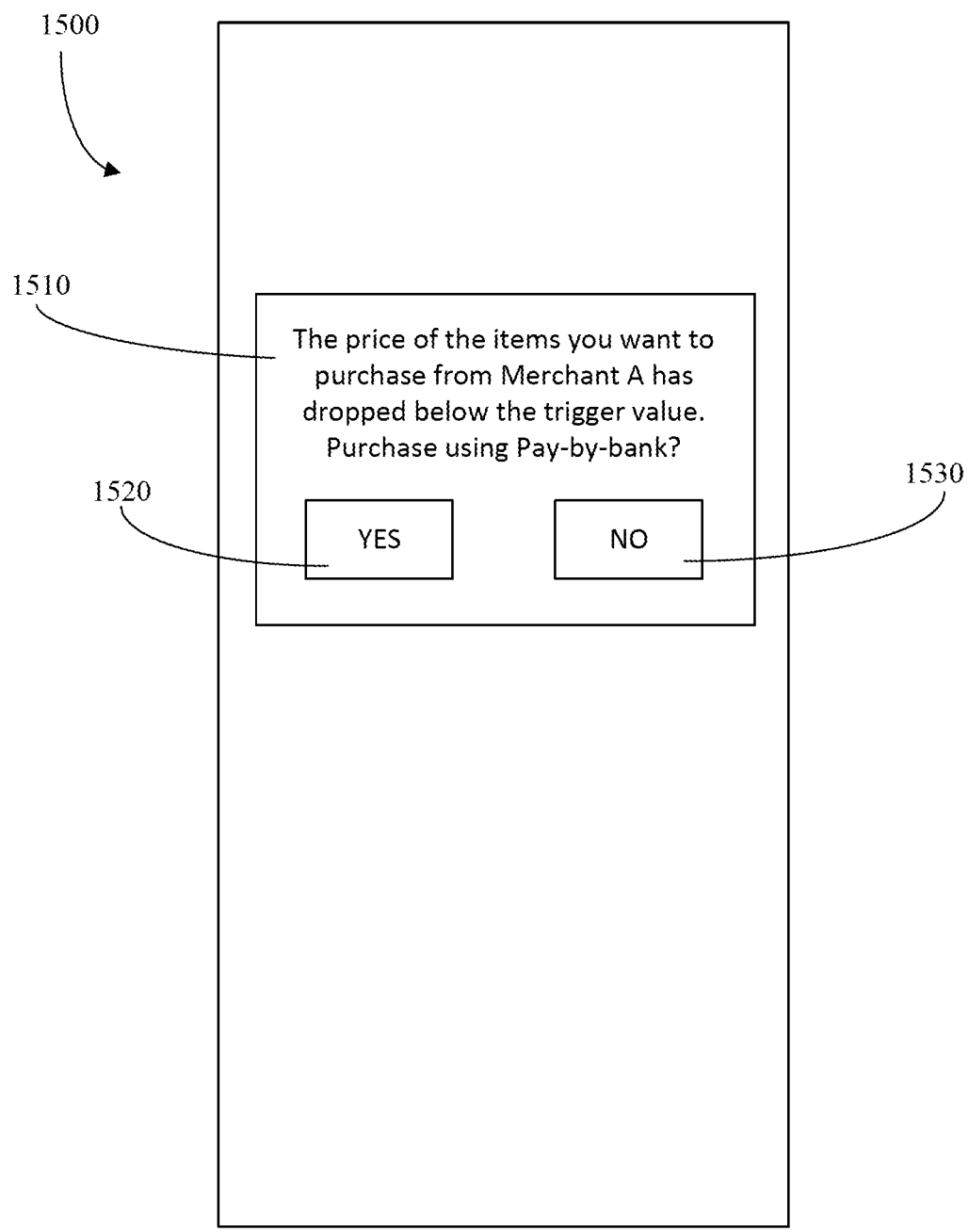
FIG. 15 is an example notification displayed on a display screen of a client device according to an embodiment.

An example notification 1500 is shown in FIG. 15. The notification 1500 includes a message 1510 notifying the user that the total price of the two or more items has dropped below the trigger threshold. The notification 1500 includes a selectable option 1520 that may be selected to purchase the two or more items using pay-by-bank and a selectable option 1530 that may be selected to not purchase the two or more items using pay-by-bank. Responsive to selection of the selectable option 1520, the server computer system 120 may perform a pay-by-bank operation to complete the purchase using pay-by-bank.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system, comprising:
a processor;
a communications module coupled to the processor; and
a memory coupled to the processor, the memory storing instructions that, when executed, configure the processor to:
receive, via the communications module and from a third party server computer system, a session handoff that includes session definition data identifying two or more items;
provide, via the communications module and to a client device, a user interface for defining instructions based on the session definition data;
receive, via the communications module and from the client device, the instructions defining at least one trigger threshold associated with the two or more items; and
responsive to determining that a sum of attributes of the two or more items is less than the at least one trigger threshold, perform an operation in accordance with the instructions defining the at least one trigger threshold, the operation including sending, via the communications module and to the client device, an alert indicating that the sum of the attributes of the two or more items is less than the trigger threshold and including a selectable option that, when selected, causes the server computer system to perform a pay-by-bank operation to complete a transfer request.

2. The server computer system of claim 1, wherein the session definition data is received by way of an application programming interface redirect initiated by the third party server computer system.

3. The server computer system of claim 1, wherein the instructions define the transfer request and the operation includes sending, via the communications module and to the third party server computer system, the transfer request.

4. The server computer system of claim 3, wherein the transfer request is sent after successful authentication of the client device.

5. The server computer system of claim 3, wherein the transfer request defines a transfer amount that is less than the sum of attributes of the two or more items, the transfer amount specified by the at least one threshold.

6. The server computer system of claim 3, wherein the instructions, when executed, further configure the processor to:
receive, via the communications module and from the third party server computer system, an indication of acceptance of the transfer request; and
perform the pay-by-bank operation to complete the transfer request.

7. The server computer system of claim 6, wherein performing the pay-by-bank operation to complete the transfer includes transferring a transfer amount from an account associated with the client device to an account associated with the third party server computer system.

8. A computer-implemented method, comprising:
- receiving, via a communications module and from a third party server computer system, a session handoff that includes session definition data identifying two or more items;
- providing, via the communications module and to a client device, a user interface for defining instructions based on the session definition data;
- receiving, via the communications module and from the client device, the instructions defining at least one trigger threshold associated with the two or more items; and
- responsive to determining that a sum of attributes of the two or more items is less than the at least one trigger threshold, performing an operation in accordance with the instructions defining the at least one trigger threshold, the operation including sending, via the communications module and to the client device, an alert indicating that the sum of the attributes of the two or more items is less than the trigger threshold and including a selectable option that, when selected, causes the server computer system to perform a pay-by-bank operation to complete a transfer request.

9. The computer-implemented method of claim 8, wherein the session definition data is received by way of an application programming interface redirect initiated by the third party server computer system.

10. The computer-implemented method of claim 8, wherein the instructions define the transfer request and the operation includes sending, via the communications module and to the third party server computer system, the transfer request.

11. The computer-implemented method of claim 10, wherein the transfer request is sent after successful authentication of the client device.

12. The computer-implemented method of claim 10, wherein the transfer request defines a transfer amount that is less than the sum of attributes of the two or more items, the transfer amount specified by the at least one threshold.

13. The computer-implemented method of claim 10, further comprising:
- receiving, via the communications module and from the third party server computer system, an indication of acceptance of the transfer request; and
- performing the pay-by-bank operation to complete the transfer request by transferring a transfer amount from an account associated with the client device to an account associated with the third party server computer system.

14. A non-transitory computer readable storage medium comprising processor-executable instructions which, when executed, configure a processor to:
- receive, via a communications module and from a third party server computer system, a session handoff that includes session definition data identifying two or more items;
- provide, via the communications module and to a client device, a user interface for defining instructions based on the session definition data;
- receive, via the communications module and from the client device, the instructions defining at least one trigger threshold associated with the two or more items; and
- responsive to determining that a sum of attributes of the two or more items is less than the at least one trigger threshold, perform an operation in accordance with the instructions defining the at least one trigger threshold, the operation including sending, via the communications module and to the client device, an alert indicating that the sum of the attributes of the two or more items is less than the trigger threshold and including a selectable option that, when selected, causes the server computer system to perform a pay-by-bank operation to complete a transfer request.

15. The server computer system of claim 1, wherein the at least one trigger threshold is based on the attributes of the two or more items.

16. The server computer system of claim 1, wherein the instructions, when executed, further configure the processor to:
- receive, via the communications module and from the client device, a signal indicating selection of the selectable option; and
- responsive to receiving the signal indication selection of the selectable option, perform the pay-by-bank operation to complete the transfer request.

17. The server computer system of claim 16, wherein performing the pay-by-bank operation to complete the transfer includes transferring a transfer amount from an account associated with the client device to an account associated with the third party server computer system.

18. The computer-implemented method of claim 8, wherein the at least one trigger threshold is based on the attributes of the two or more items.

19. The computer-implemented method of claim 8, further comprising:
- receiving, via the communications module and from the client device, a signal indicating selection of the selectable option; and
- responsive to receiving the signal indication selection of the selectable option, performing the pay-by-bank operation to complete the transfer request.

20. The computer-implemented method of claim 19, wherein performing the pay-by-bank operation to complete the transfer includes transferring a transfer amount from an account associated with the client device to an account associated with the third party server computer system.

* * * * *